April 27, 1926. 1,582,245
E. BRUDER
DIRIGIBLE LIGHT FOR VEHICLES
Filed Feb. 7, 1925  2 Sheets-Sheet 1
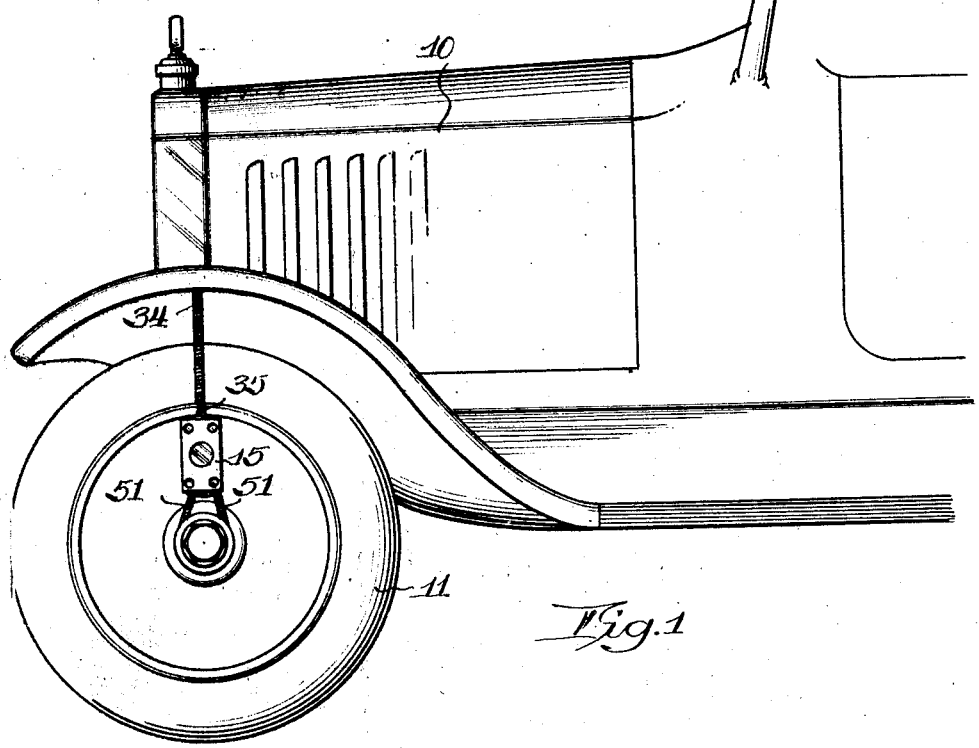
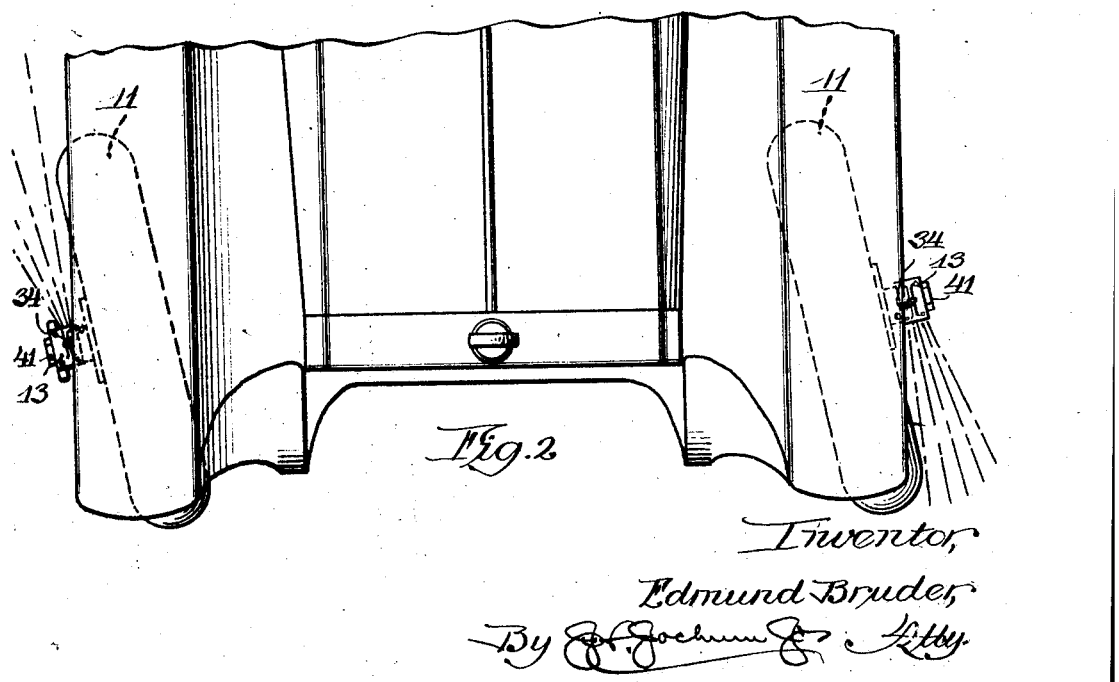
Inventor,
Edmund Bruder, April 27, 1926.
E. BRUDER
DIRIGIBLE LIGHT FOR VEHICLES
Filed Feb. 7, 1925   2 Sheets-Sheet 2
1,582,245
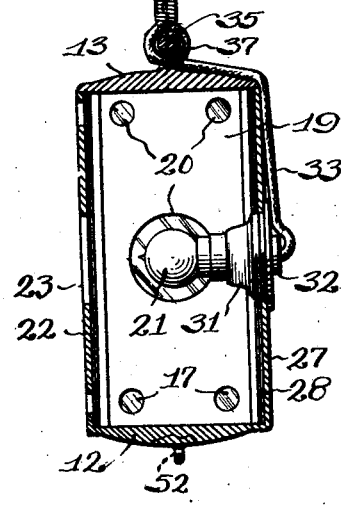
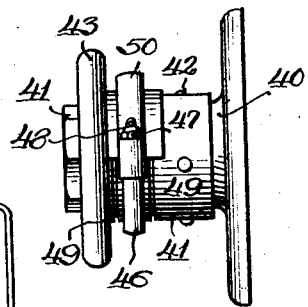
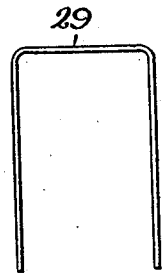
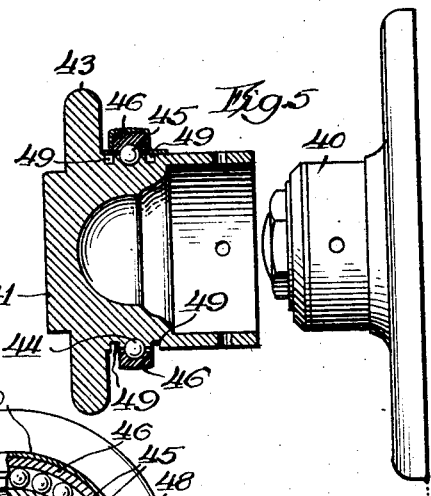
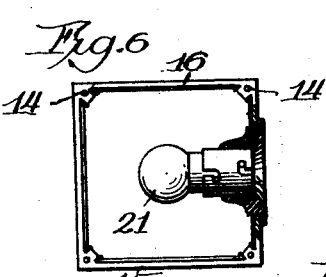
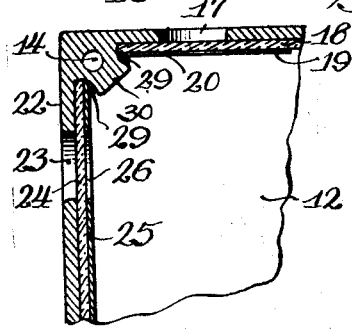
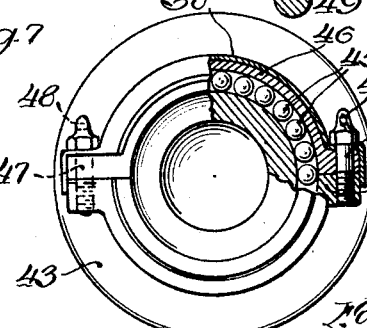

Patented Apr. 27, 1926.

1,582,245

UNITED STATES PATENT OFFICE.

EDMUND BRUDER, OF CHICAGO, ILLINOIS, ASSIGNOR TO ALBERT H. GLOS, OF CHICAGO, ILLINOIS.

DIRIGIBLE LIGHT FOR VEHICLES.

Application filed February 7, 1925. Serial No. 7,500.

*To all whom it may concern:*

Be it known that I, EDMUND BRUDER, a citizen of the United States, residing at Chicago, in the county of Cook and State of Illinois, have invented certain new and useful Improvements in Dirigible Lights for Vehicles, of which the following is a specification.

This invention relates to lights of the type commonly known as dirigible head lights whereby the rays of light therefrom will be thrown into the path of the forward wheels when the vehicle is rounding a curve or making a turn.

Heretofore the head lights of the vehicle have been used for such purpose and such lights have been generally connected with or actuated from the turning or steering knuckle, with the result that the light rays are thrown out of the line of the vehicle until the wheels are moved to a position that the rear wheels will track therewith.

It is one of the objects of the present invention to provide an improved dirigible light that may be used in connection with the head lights and which will be mounted adjacent and connected with the wheel hub and which will be flexibly supported to overcome undue vibration and which will be twisted or shifted by the wheels when the vehicle is turned, so that the rays of light therefrom will always be positioned in the path of the wheel and visible not only from the front of the vehicle, to approaching vehicles, but the lights will also operate as a signal to a following vehicle and at the same time serve to indicate to a vehicle the direction of turning of the vehicle upon which the light is mounted.

A further object is to provide an improved light of this character which is adapted to be readily applied to any vehicle.

To the attainment of these ends and the accomplishment of other new and useful objects the invention consists in the features of novelty in substantially the construction, combination and arrangement of the several features hereinafter more fully described and claimed and as shown in the accompanying drawings and in which drawings, Figure 1, is a side elevation of a portion of an automobile having a light constructed in accordance with the principles of this invention applied thereto.

Figure 2, is a top plan view of Figure 1.

Figure 3, is a detail vertical sectional view of a portion of the vehicle and the lamp.

Figure 4, is an elevation of the anchoring device which is connected with the wheel hub.

Figure 5, is a view of the parts shown in Figure 4 partly in section and with the parts separated.

Figure 6, is a top plan view of the light casing with the top removed.

Figure 7, is an enlarged detail horizontal sectional view of a portion of the lamp casing.

Figure 8, is a left hand end elevation of Figure 4 with parts broken away.

Figure 9, is an elevation of the fastening device for securing the lenses or light screens in the lamp casing.

Referring more particularly to the drawings, the numeral 10 designates a portion of an automobile having front wheels 11 adapted to be deflected in the usual manner, not shown, for steering the vehicle. Connected with each of the front wheels are lights, and as the construction of each of the lights is the same the description of one will apply to them both.

The light consists of a casing of any desired size and configuration but is preferably rectangular in cross section. The bottom 12 is preferably integral with the walls and the cap or cover 13 may be removably secured in position in any suitable manner such as by means of fastening devices, not shown, adapted to enter apertures or openings 14 in the top of the upright walls.

The front 15 of the casing is provided with one or more openings having a suitable screen or lens extending there across, and the back wall 16 is provided with one or more openings 17 across which a lens or screen 18 extends and in front of the lens 18 is arranged a suitable reflector 19 having openings 20 registering with the openings 17 and operates to reflect the rays from the lamp 21 through the opening in the front wall 15 of the lamp casing.

A similar lens or screen is arranged to extend across the opening in the front wall 15 and serves to reflect the rays from the light 21 through the openings 17. The side wall 22 is provided with one or more openings 23 across which a lens or screen 24 extends and a reflector 25 is provided against the lens 24 and is provided with an opening or openings 26 registering with the openings 23.

The lamp 21 is removably held in position by passing through the wall 27 and is secured in position preferably by having threaded engagement in an opening in the wall 27 and a reflector 28 may be provided against the wall 27 for reflecting the light rays through the opening 23 in the wall 22.

Any suitable means may be provided for securing the lens or screens and reflectors in position such as fastening devices 29 preferably in the form of a substantially U shaped member adapted to engage behind lugs or projections 30 which latter project preferably from the corners of the casing and between the proximate edges of adjacent lenses or screens and reflectors as shown more clearly in Figure 7.

The lamp 21 is preferably connected with a removable socket member 31 in which a plug 32 of any suitable type is seated and a conductor wire 33 is connected with the plug.

The lamp is flexibly suspended from the vehicle in any suitable manner such as by means of a resilient element 34 one end of which is connected to the lamp casing preferably to an eye or loop 35 on the cover 13, and the other end is connected with a fixed portion of the vehicle such as the fender 36. The member 34 is preferably of a coil spring construction and tubular so that the conductor 33 can be passed therethrough, the conductor being preferably threaded and looped through the eye or loop 35 as at 37 to prevent pulling out the plug 33 by the motion of the lamp with respect to the vehicle. The conductor 33 preferably passes under the fender 36 and may be secured in position by a suitable clip 38 and may if desired be passed through the fender as at 39.

Connected with the hub 40 of the wheel 11 is a cap 41 adapted to be sleeved over the hub and secured in any suitable manner such as by means of screws or fastening devices 42, and said cap is provided with a circumferential flange 43 and a peripheral recess 44 which latter serves as a race for roller bearings 45 such as balls.

Sectional bearing members 46 co-operate to hold the balls in the race way and these members are secured together preferably by screws or bolts 47 the heads of which are provided with apertures 48 for a purpose to be set forth.

Grooves 49 are provided on each side of the race way 44 and serve to receive water and convey it away from the ball bearing.

A shield 50 may be provided for the ball bearing and preferably extends over a portion of the grooves 49. This shield is preferably held in position by means of the screws or bolts 47.

Resilient members 51 are secured by one end to suitable eyes or apertured lugs 52 on the bottom 12 of the lamp casing and the other ends of these resilient elements, which are preferably in the form of coil springs, are secured respectively in the apertures 48 in the heads of the bolts or screws 47.

These resilient elements 51 are so arranged that when the wheel 11 is deflected with respect to the vehicle, the light will be correspondingly deflected or twisted, and at the same time the lamp casing will be yieldingly held in position.

The ball bearing which encompasses the hub cap will not interfere with the rotation of the wheel and at the same time will prevent friction and binding between the parts.

In use when the wheels 11 are deflected, the respective light casings will be correspondingly deflected or twisted to cause the light rays from the front of the lamps to be thrown at all times in advance of the wheels and at the same time and by reason of the lenses 20 in the back of the lamp casing there will be exposed a signal light to a following vehicle and also to a vehicle that may be approaching from the side, while the lens or opening on the side of the lamp will also constitute another and different signal or indication.

Obviously any color lenses or light screens may be employed to cover the respective openings in the walls of the lamp casing.

The lamp casing being adjacent and on the outside of the wheels will not cause confusion and will obviate the necessity of employing or twisting the usual head lights on the vehicle. The lenses or screens may be readily removed by removing the securing or fastening devices 29.

While the preferred form of the invention has been herein shown and described it is to be understood that various changes may be made in the details of construction and in the combination and arrangement of the various parts, within the scope of the claims, without departing from the spirit of this invention.

What is claimed as new is:

1. In combination, a wheel supported vehicle, means for deflecting certain of the wheels for steering the vehicle, a light, means flexibly supporting the light from a portion of the vehicle with respect to which the wheels are deflectable, and means connecting the light with the hub of one of the last recited wheels to be deflected thereby.

2. In combination, a wheel supported vehicle, certain of said wheels being adapted, to be deflected to steer the vehicle, a light supported by the vehicle independent of the wheel and of the steering mechanism and in proximity to one of the last said wheels adjacent the outside of the wheel, and means connecting said light with the hub of the wheel to be deflected by the wheel and with respect to its support.

3. In combination a vehicle, a steering traction wheel, a lamp, means supporting the lamp upon the vehicle, and means connecting the lamp directly with the hub of said wheel and on the outside of the wheel, the said lamp being adapted to be deflected with respect to its support and by the said wheel when the latter is deflected with respect to the vehicle.

4. In combination, a vehicle, a steering traction wheel, a lamp, means flexibly supporting the lamp from a portion of the vehicle with respect to which the wheel is deflectable, said lamp being disposed adjacent the wheel and on the outside thereof within the periphery of the wheel, and a connection between the lamp and the hub of the wheel.

5. In combination a vehicle, a traction wheel therefor adapted to be deflected with respect thereto, a lamp, means flexibly supporting the lamp upon the vehicle, a flexible anchor connected with the lamp, and means for securing the said anchor to the wheel hub on the outside of the wheel.

6. In combination, a vehicle, a traction wheel therefor adapted to be deflected with respect thereto, a lamp, means flexibly supporting the lamp upon the vehicle, an anchor connected with the lamp, and means for securing the said anchor to the wheel hub on the outside of the wheel, the last recited means including a roller bearing in which the said hub operates.

7. In combination, a vehicle, a traction wheel therefor adapted to be deflected with respect thereto, a lamp, means flexibly supporting the lamp upon the vehicle, a roller bearing adjacent the outer end of the wheel hub and in which bearing the hub operates, a flexible anchor connected with the lamp, means securing the said anchor to the said bearing, and a shield for the said bearing.

8. In combination a wheel supported vehicle, certain of the wheels being deflectable to steer the vehicle, a lamp anchored to the vehicle and operatively connected with one of the wheels, said lamp being adapted to be rotated by the last recited wheel on an upright axis and with respect to the vehicle, and means whereby the light rays will be simultaneously visible from in front and from behind the vehicle.

9. In combination a wheel supported vehicle, certain of the wheels being deflectable to steer the vehicle, a lamp anchored to the vehicle and operatively connected with one of said wheels and adapted to be rotated by the last said wheel on an upright axis and with respect to the vehicle, and means whereby the light rays will be simultaneously visible from in front of and from behind the vehicle, the said lamp being disposed in close proximity to one of said deflectable wheels and adjacent the outer face thereof.

In testimony whereof I have signed my name to this specification, on this 4th day of February, A. D. 1925.

EDMUND BRUDER.